(12) United States Patent
Son et al.

(10) Patent No.: US 7,719,642 B2
(45) Date of Patent: May 18, 2010

(54) BACKLIGHT DEVICE FOR LIQUID CRYSTAL DISPLAY

(75) Inventors: Hyeon-ho Son, Kyonggi-do (KR); Jong-weon Moon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 62 days.

(21) Appl. No.: 10/986,229

(22) Filed: Nov. 12, 2004

(65) Prior Publication Data

US 2005/0062915 A1    Mar. 24, 2005

Related U.S. Application Data

(63) Continuation of application No. 09/657,506, filed on Sep. 8, 2000, now Pat. No. 6,822,710.

(30) Foreign Application Priority Data

Sep. 8, 1999    (KR) ............................... 1999-38155

(51) Int. Cl.
    *G02F 1/1335*    (2006.01)
(52) U.S. Cl. ........................ 349/115; 349/98
(58) Field of Classification Search ................. 349/115
    See application file for complete search history.

(56) References Cited

U.S. PATENT DOCUMENTS

| 5,506,704 | A |  | 4/1996 | Broer et al. .................... 349/98 |
| 5,691,789 | A |  | 11/1997 | Li et al. ......................... 349/98 |
| 5,712,694 | A | * | 1/1998 | Taira et al. ...................... 349/9 |
| 5,999,243 | A |  | 12/1999 | Kameyama et al. ......... 349/185 |
| 6,016,177 | A |  | 1/2000 | Motomura et al. ............ 349/98 |
| 6,088,079 | A |  | 7/2000 | Kameyama et al. ......... 349/185 |
| 6,103,323 | A |  | 8/2000 | Motomura et al. ........... 428/1.3 |
| 6,166,790 | A |  | 12/2000 | Kameyama et al. ........... 349/96 |
| 6,339,501 | B1 |  | 1/2002 | Kameyama et al. ......... 359/485 |
| 6,342,934 | B1 |  | 1/2002 | Kameyama et al. ........... 349/98 |
| 6,377,325 | B2 |  | 4/2002 | Faris et al. ..................... 349/98 |
| 6,433,853 | B1 |  | 8/2002 | Kameyama et al. ......... 349/176 |
| 6,504,589 | B1 | * | 1/2003 | Kashima et al. ............... 349/96 |

FOREIGN PATENT DOCUMENTS

| KR | 1998-077672 A | 11/1998 |
| KR | 1999-0067155 A | 8/1999 |
| WO | WO-97/16762 A1 | 5/1997 |

* cited by examiner

*Primary Examiner*—David Nelms
*Assistant Examiner*—W. Patty Chen
(74) *Attorney, Agent, or Firm*—Birch, Stewart, Kolasch & Birch LLP

(57) ABSTRACT

A backlight device for a liquid crystal display device includes a light source providing light; a light waveguide plate 40 guiding light from the light source, having an emitting surface, a front surface and a bottom surface, the emitting surface adjacent to the light source; a reflector arranged under the bottom surface of the light wave guide plate, reflecting light; and at least one cholesteric liquid crystal (CLC) film arranged over the front surface of the light wave guide plate, collimating light.

9 Claims, 6 Drawing Sheets

BACKLIGHT DEVICE FOR LIQUID CRYSTAL DISPLAY

CROSS REFERENCE

This application is a continuation of application Ser. No. 09/657,506 filed on Sep. 8, 2000 now U.S. Pat. No. 6,822,710. This application claims the benefit of Korean Patent Application No. 1999-38155, filed on Sep. 8, 1999, under 35 U.S.C. §119, the entirety of which is hereby incorporated by reference.

BACKGROUND OF THE INVENTION

1. Field of the Invention

The present invention relates to a backlight device, and more particularly, to a backlight device for use in a liquid crystal display (LCD) device.

2. Description of Related Art

FIG. 1 shows a conventional backlight device for use in an LCD device. As shown in FIG. 1, the conventional backlight device 100 includes a light source 10, a U-shaped lamp holder 15 having a lamp reflector 16, a light waveguide plate 40, a reflector 50, and a prism sheet 20. The light source 10 is located adjacent to an end 40a of the light waveguide plate 40, and most of the light source 10 is surrounded by the lamp holder 15. The end 40a constitutes a surface through which the incident light from the light source 10 is emitted. The prism sheet 20 is arranged on a front surface 40b of the light wave guide plate 40, and the reflector 50 is located under a bottom surface 40c of the light wave guide plate 40.

The emitted light from the light source 10 is directed toward the surface 40a of the light waveguide plate 40 by the lamp reflector 16 and is then directed either toward a prism sheet 20 or a reflector 50. The light reflected by the reflector 50 is emitted toward the observer through a prism sheet 20, and a liquid crystal panel (not shown) in the form of an information.

FIG. 2 is a graph illustrating brightness with respect to an angle of light passing through the prism sheet. As shown in FIG. 2, brightness distribution is discursive. In other words, light passing through the prism sheet 20 is not well collimated. As a result, light collimating efficiency is bad, and collimating loss takes place at portions "A". In addition, in the conventional backlight device of such a structure, it is not easy to narrow an angle of light passing through the prism sheet to a desirable angle range (for example, from −40 degrees to +40 degrees).

For the foregoing reasons, there is a need for a backlight device having a high light collimating efficiency.

SUMMARY OF THE INVENTION

To overcome the problem described above, preferred embodiments of the present invention provide a backlight device having a high light collimating efficiency.

In order to achieve the above object, a preferred embodiment of the present invention provides a backlight device for a liquid crystal display device, including: a light source providing light; a light waveguide plate guiding light from the light source, having an emitting surface, a front surface and a bottom surface, the emitting surface being adjacent to the light source; a reflector arranged under the bottom surface of the light wave guide plate, reflecting light; and at least one cholesteric liquid crystal (CLC) film arranged over the front surface of the light wave guide plate, collimating light.

The CLC film has a one-layered structure of one of either a right or a left handed CLC layer, wherein the right and left handed CLC layer selectively reflect right and left-handed circularly polarized light, respectively. The CLC film may also have a dual-layered structure of a right and a left handed CLC layer, wherein the right and left handed CLC layer selectively reflect right and left-handed circularly polarized light, respectively. The backlight device further includes a prism sheet arranged between the CLC film and the front surface of the light wave guide plate.

By using the backlight device according to preferred embodiments of the present invention, light collimating efficiency and brightness can be improved.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, examples of which are illustrated in the accompanying drawings.

Figure 1:
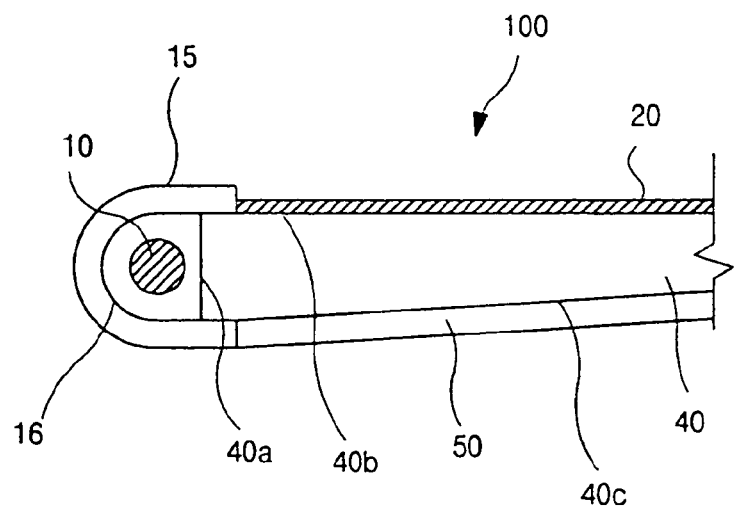
FIG. 1 shows a conventional backlight device for use in a LCD device.
Figure 2:
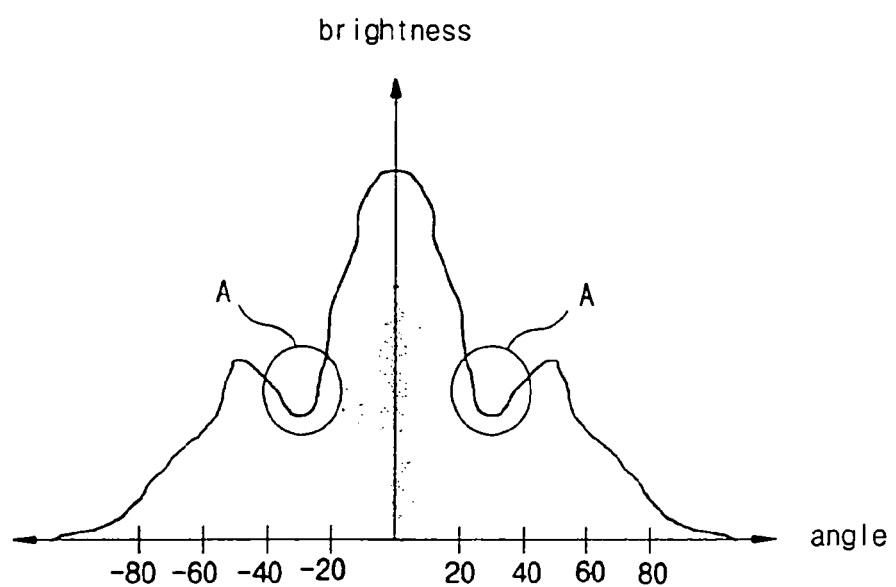
FIG. 2 is a graph illustrating brightness with respect to an angle of light passing through a prism sheet.
Figure 3:
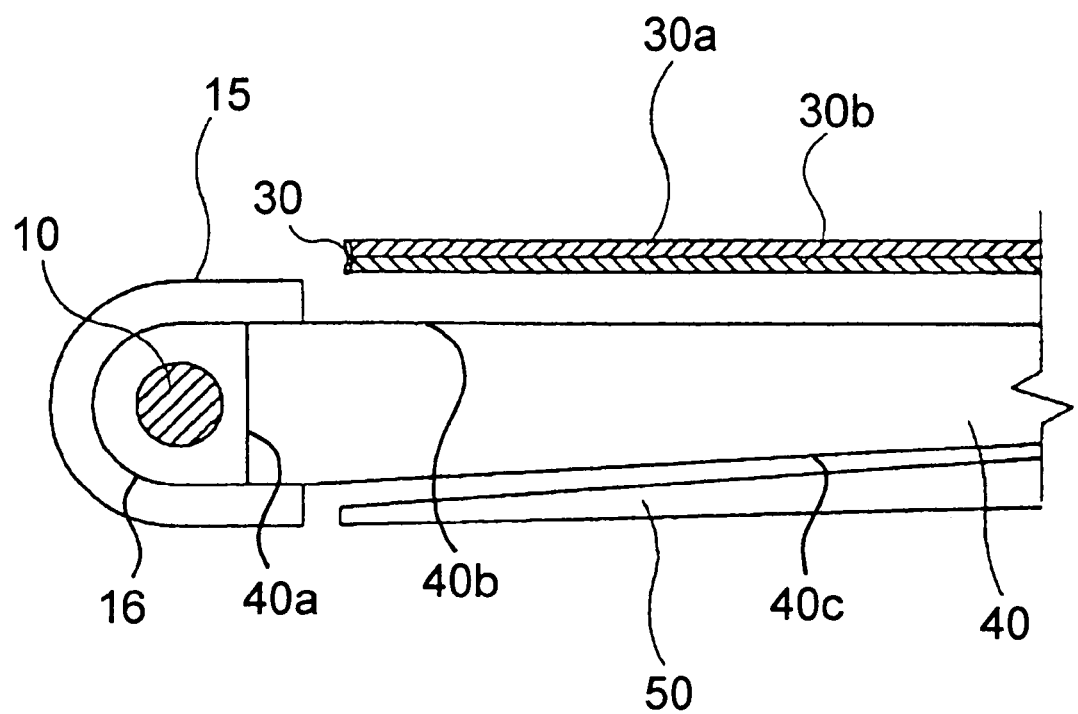
FIG. 3 is a cross-sectional view illustrating a backlight device according to a preferred embodiment of the present invention.

FIG. 3 is a cross-sectional view illustrating a backlight device according to a preferred embodiment of the present invention. As shown in FIG. 3, the backlight device includes a light source 10, a U-shaped lamp holder 15 having a lamp reflector 16, a light waveguide plate 40, a reflector 50, and a cholesteric liquid crystal (CLC) film 30. The light source 10 is located adjacent to an end 40a of the light waveguide plate 40, and most parts of the light source 10 are surrounded by the lamp holder 15. The end 40a constitutes a surface through which the incident light from the light source 10 is emitted. The CLC film 30 is arranged on a front surface 40b of the light wave guide plate 40, and the reflector 50 is located under a bottom surface 40c of the light wave guide plate 40.

The CLC film 30 serves to collimate light emitting from the light source 10 and preferably has a dual-layered structure of right-handed and left-handed CLC layers 30a and 30b. Since direction vector of the liquid crystal is helical in cholesteric state, the CLC film 30 reflects only light that is the same in helical director and satisfies Bragg reflection condition. In other words, the right-handed CLC layer 30a reflects only a right-handed circularly polarized light, and the left-handed CLC layer 30b reflects only a left-handed circularly polarized light. Using this principle, lost light can be restored, thereby improving the light collimating efficiency and brightness. The CLC film 30 may have a one-layered structure of either the right or the left-handed CLC layer. However, since light has a right-handed circularly polarized light and a left-handed circularly polarized light, it is preferable that the CLC film 30 has a dual-layered structure of the right and the left-handed CLC layers 30a and 30b.

Figure 4:
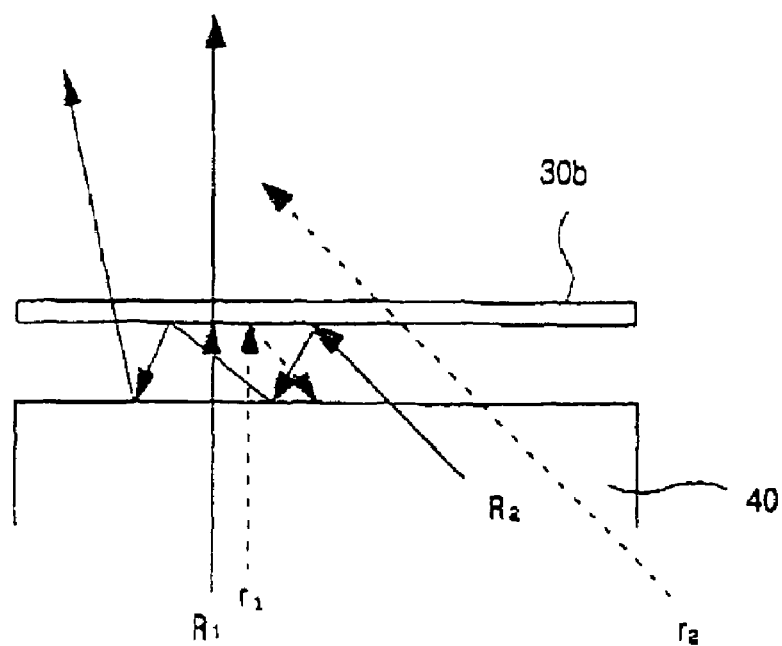
FIG. 4 shows a principle that the CLC film 30 collimates light according to a preferred embodiment of the present invention.

FIG. 4 shows a principle by which the CLC film 30 collimates light. As shown in FIG. 3, a left-handed circularly polarized light R1 incident within a certain angle, which has a wavelength less than 780 nm, passes through the left-handed CLC layer 30b, and a left-handed polarized light R2 incident out of a certain angle, which has a wavelength less than 780 nm, is reflected. The left-handed polarized light R2 incident out of a certain angle is reflected again by the light wave guide plate 40 or a reflector (not shown) and directs toward the left-handed CLC layer 30b. it is repeated until the left-handed polarized light R2 incident out of a certain angle becomes light incident within a certain angle to pass through the CLC layer 30b.

Figure 5A:
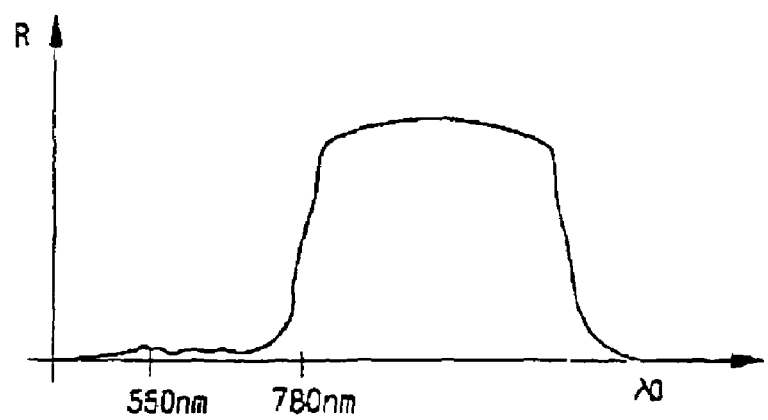
FIG. 5A is a graph illustrating a reflectance with respect to a wavelength of light vertically incident on a cholesteric liquid crystal (CLC) film according to a preferred embodiment of the present invention.

FIG. 5A is a graph illustrating a reflectance with respect to a wavelength of light vertically incident on the CLC film. "R" denotes a reflectance, and "$\lambda_1$" denotes a wavelength of vertically incident light. The CLC film 30 also serves to transmit only light of a certain wavelength by controlling a helical pitch. The wavelength of light vertically incident on the CLC film 30 can be obtained by the following formula: $\lambda_o = P(n_o + n_e)/2$. In the formula, "$\lambda_o$" is a wave length of vertically incident light, "P" is a helical pitch, "$n_o$" is an ordinary refractive index, and "$n_e$" is an extraordinary refractive index. Therefore, by controlling a helical pitch of the CLC film 30, an ideal visible ray having a wavelength of from 380 nm to 780 nm can be transmitted, as shown in FIG. 4. By controlling a helical pitch of the CLC film 30, it is also possible for the CLC film 30 to transmit a wavelength of vertically incident light less than 780 nm in light of a prism sheet.

Figure 5B:
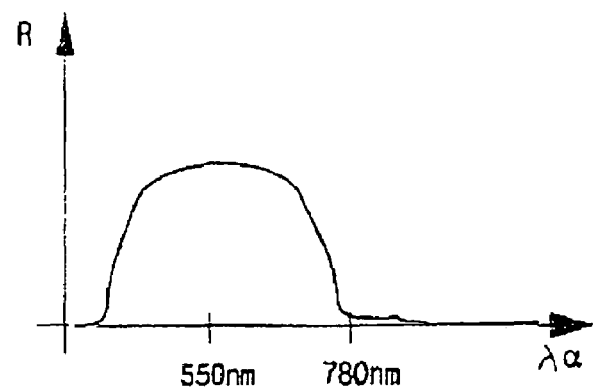
FIG. 5B is a graph illustrating a reflectance with respect to a wavelength of light non-vertically incident on the CLC film.

FIG. 5B is a graph illustrating a reflectance with respect to a wavelength of light obliquely incident on the CLC film. "R" is a reflectance, and "$\lambda_\alpha$" is a wavelength of obliquely incident light with a certain angle "$\alpha$". A wavelength of obliquely incident light with a certain angle "$\alpha$" can be obtained by the following formula: "$\lambda_\alpha$" = $\lambda_o \cos[\sin^{-1}\{2 \sin \alpha(n_o+n_e)\}]$. In order to reflect a visible ray of from 380 nm to 780 nm and transmit a wavelength of light greater than 780 nm, it is preferable that an average refractive index "$(n_o+n_e)/2$" of the CLC film 30 is as small as possible.

Figure 6:
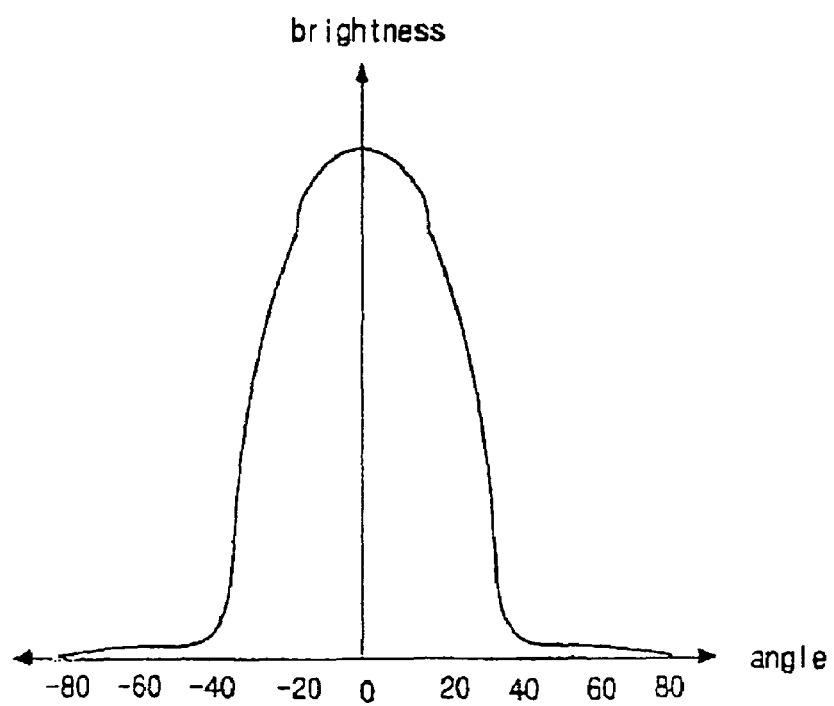
FIG. 6 is a graph illustrating brightness with respect to an angle of light passing through the CLC film.

As described above, the CLC film 30 according to the preferred embodiment of the present invention selectively reflects light with a wavelength of more than 780 nm. However, it is also possible to selectively reflect light with a wavelength of more than 600 nm by controlling a helical pitch of the CLC film 30 so that only a wavelength of an ideal visible ray generated from the backlight device may be transmitted FIG. 6 is a graph illustrating brightness with respect to an angle of light passing through the CLC film 30. As shown in FIG. 6, by arranging the CLC film 30 having the right and left-handed CLC layers 30a and 30b, brightness distribution can be concentrated within a range between −40 degree and +40 degree.

Figure 7:
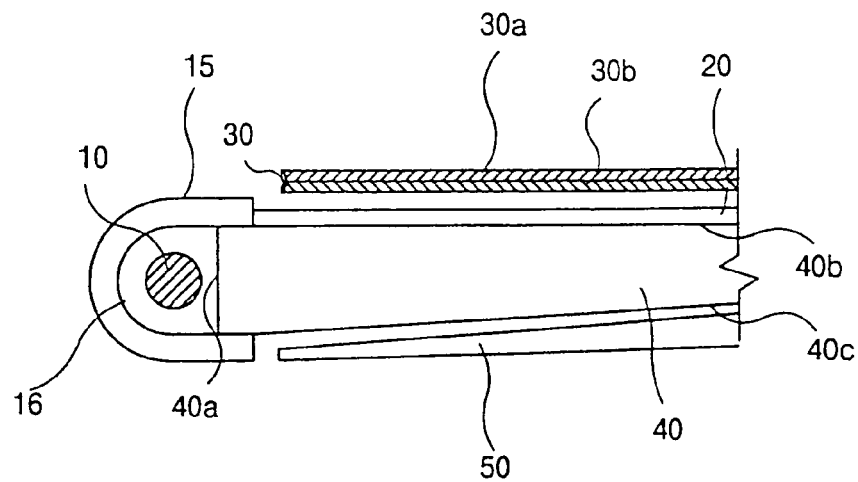
FIGS. 7, 8 and 9 are cross-sectional views illustrating modifications of the backlight device according to a preferred embodiment of the present invention.

The backlight device according to the preferred embodiment of the present invention may further include a prism sheet 20 as shown in FIG. 7.

Figure 8:
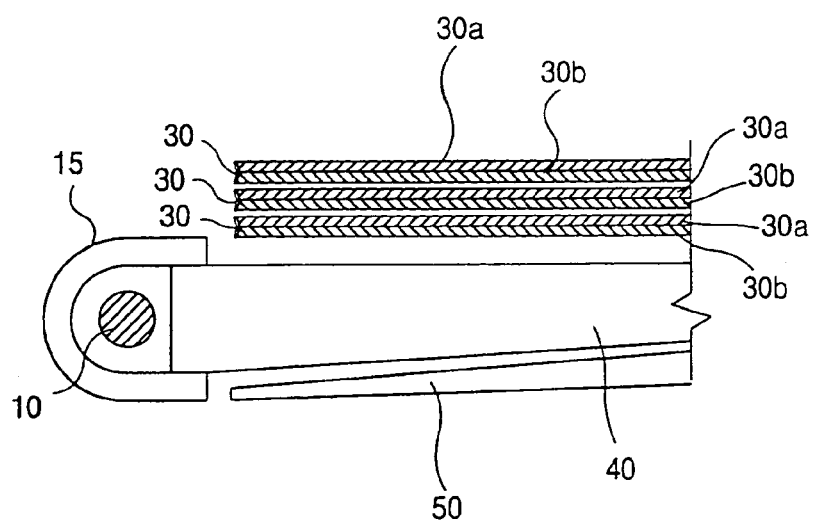
Figure 9:
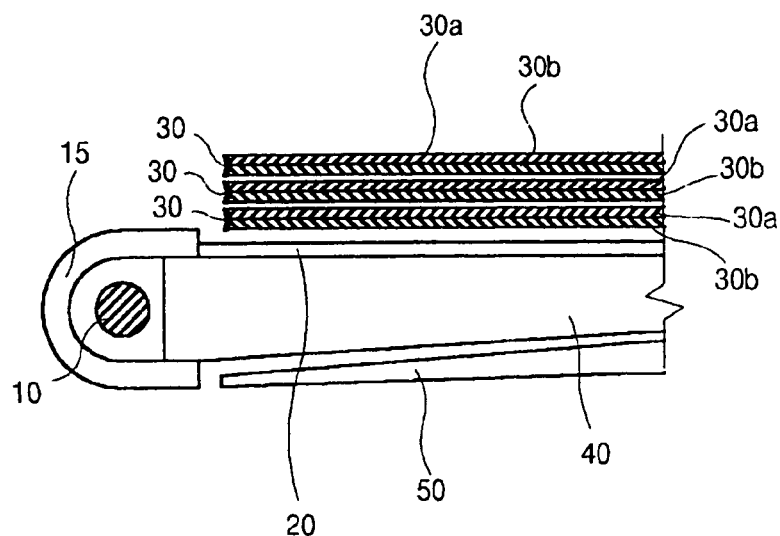

The backlight device according to the preferred embodiment of the present invention may further include a plurality of the CLC films 30 without or with the prism sheet 20 as shown in FIGS. 8 and 9, respectively.

Figure 10:
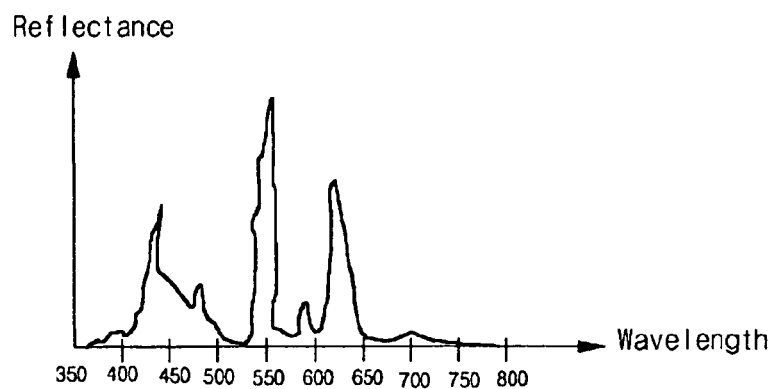
FIG. 10 is a graph illustrating brightness with respect to a wavelength of spectrum.

Further, one of the right and left-handed CLC layers 30a and 30b may be constructed to selectively reflect all the wavelength range of from 400 nm to 1000 nm, and the other may be constructed to selectively reflect vertically incident light with a wavelength of more than 600 nm. As a result, since only one of the right and the left-handed circularly polarized lights is transmitted, a light collimating efficiency and brightness can be improved. Further, it is possible to include the CLC layer which selectively reflects vertically incident light with a wavelength of from 480 nm to 530 nm and selectively reflects vertically incident light with a wavelength of from 560 nm to 610 nm in the light of spectrum of the backlight device shown in FIG. 10. Therefore, a color spot, which may occur when the plurality of CLC films are arranged so that vertically incident light with a wavelength of more than 600 nm is transmitted, can be prevented, and the light collimating efficiency can be improved to as narrow a range as between −30 degrees and +30 degrees.

Figure 11:
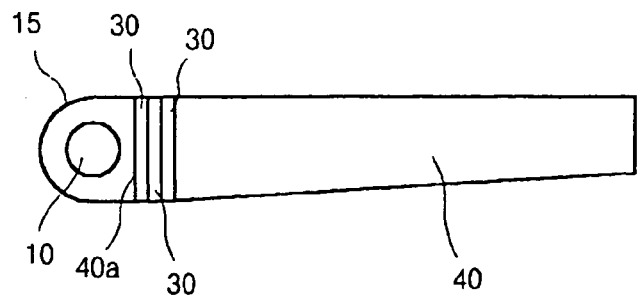
FIG. 11 is a cross sectional view illustrating another modification of the backlight device according to a preferred embodiment of the present invention.

FIG. 11 shows a modified backlight device according to another preferred embodiment of the present invention. As shown in FIG. 11, at least one CLC film 30 may be arranged on the end 40a of the light wave guide plate 40 adjacent to the light source 15. By doing this, light emitting from the light source 10 can be collimated. Therefore, when incident light within a certain angle (a range between about −30 degree and about +30 degree) is directed into the light wave guide plate 40, it is easy to design the light wave guide plate 40 to guide light in a desirable distribution.

As described above, by using the backlight device according to preferred embodiments of the present invention, light collimating efficiency and brightness can be improved.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A back light device for a liquid crystal display device, comprising:
   a light source providing light;
   a light waveguide plate guiding light from the light source, and said light waveguide plate having an emitting surface, a front surface and a bottom surface, the emitting surface being adjacent to the light source;
   a reflector arranged under the bottom surface of the light waveguide plate, reflecting light; and
   at least one single layer cholesteric liquid crystal (CLC) film arranged on the front surface of the light waveguide plate, collimating light, wherein the at least one single layer CLC film transmits a first circularly polarized vertically incident visible light and circularly polarized obliquely incident light having a wavelength greater than about 780 nm and wherein the at least one single layer CLC film reflects a first circularly polarized obliquely incident visible light, a second circularly polarized vertically incident visible light and a second circularly polarized obliquely incident visible light having a wavelength range from 380 nm to 780 nm and a circularly polarized vertically incident light having a wavelength greater than about 780 nm.

2. The back light device of claim 1, wherein the single layer CLC film is one of either a right-handed or a left-handed CLC layer, the right-handed CLC layer selectively reflecting right-handed circularly polarized light and the left-handed CLC layer reflecting left-handed circularly polarized light.

3. The back light device of claim 1, wherein the at least one single layer CLC film has a dual-layered structure having both a right-handed and a left-handed CLC layer, the right-handed and left-handed CLC layer selectively reflecting right-handed and left-handed circularly polarized light, respectively.

4. The back light device of claim 1, further comprising a prism sheet arranged between the at least one single layer CLC film and the front surface of the light waveguide plate.

5. A back light device for a liquid crystal display device, comprising:
- a light source providing light;
- a light waveguide plate guiding light from the light source, and said light waveguide plate having an emitting surface, a front surface and a bottom surface, the emitting surface being adjacent to the light source;
- a reflector arranged under the bottom surface of the light waveguide plate, reflecting light; and
- at least one single layer cholesteric liquid crystal (CLC) film arranged over the front surface of the light waveguide plate, collimating light, wherein the at least one single layer CLC film transmits a first circularly polarized visible light incident within a predetermined angle and a circularly polarized light of a wavelength greater than about 780 nm incident outside the predetermined angle, and wherein the at least one single layer CLC film reflects the first circularly polarized visible light incident outside the predetermined angle, a second circularly polarized visible light incident within the predetermined angle and the second circularly polarized visible light incident outside the predetermined angle and having a wavelength range from 380 nm to 780 nm and the circularly polarized light of a wavelength greater than about 780 nm incident within the predetermined angle.

6. The back light device of claim 1, wherein the at least one CLC film selectively reflects vertically incident light with a wavelength of more than 600 nm by controlling a helical pitch P of said CLC film according to the equation:

$$\lambda_o = P(n_o + n_e)/2,$$

where $\lambda_o$ is a wavelength of vertically incident light, P is a helical pitch, no is an ordinary refractive index, and ne is an extraordinary refractive index.

7. The back light device of claim 5, wherein each single layer CLC film is one of either a right-handed or a left-handed CLC layer, each right-handed CLC layer selectively reflecting right-handed circularly polarized light and each left-handed CLC layer reflecting left-handed circularly polarized light.

8. The backlight device of claim 5, wherein each single layer CLC film is formed by a dual-layered structure, each structure having both a right-handed and a left-handed CLC layer, the right-handed and left-handed CLC layer selectively reflecting right-handed and left-handed circularly polarized light, respectively.

9. The back light device of claim 5, further comprising a prism sheet arranged between the at least one single layer CLC film and the front surface of the light waveguide plate.

* * * * *